No. 830,642. PATENTED SEPT. 11, 1906.
E. CHAQUETTE.
MOTOR VEHICLE.
APPLICATION FILED JUNE 19, 1905.

2 SHEETS—SHEET 1.

Attest:
Inventor:
Ephraiem Chaquette,
by J.W. Barker
Atty.

No. 830,642. PATENTED SEPT. 11, 1906.
E. CHAQUETTE.
MOTOR VEHICLE.
APPLICATION FILED JUNE 19, 1905.

2 SHEETS—SHEET 2.

Attest:
W. McGinn
F. Alexander

Inventor:
Ephraim Chaquette
by F. W. Barker
Atty.

UNITED STATES PATENT OFFICE.

EPHRAIEM CHAQUETTE, OF NEW ROCHELLE, NEW YORK.

MOTOR-VEHICLE.

No. 830,642.  Specification of Letters Patent.  Patented Sept. 11, 1906.

Application filed June 19, 1905. Serial No. 265,894.

*To all whom it may concern:*

Be it known that I, EPHRAIEM CHAQUETTE, a citizen of the United States of America, and a resident of New Rochelle, in the county of Westchester and State of New York, have invented certain new and useful Improvements in Motor-Vehicles, of which the following is a specification.

This invention relates to means of transmitting power in propelling motor-vehicles; and its main object is to enable power generated by the motor to be applied to turn the front or steering wheels as well as the rear wheels.

As is well known in the art pertaining to motor-vehicles, the common practice is to communicate power through the engine-shaft to turn the rear wheels of the vehicle, whereby because the main load is in advance of the rear axle a thrusting or pushing effect is exercised in moving the vehicle. Because under the steering arrangement in vogue the front or steering wheels are adapted to assume varying angles with respect to their axle it has hitherto not been found practicable to apply motive power thereto. Nevertheless the student of dynamics is aware that inertia is more readily overcome by pulling than by pushing, for which reason, other conditions being equal, there is an advantage in applying the motive power to the front wheels. This being the case and realizing that by turning the front wheels as well as the rear wheels with the power developed by the motor, thereby distributing the propelling energy to all the traction members, a distinct gain is effected, a vehicle so equipped being capable of carrying a greater load with the same motor efficiency. In working out this idea I have devised means whereby the flexibility of the front wheels in steering is not impaired, although deriving driving power from the motor which drives the rear wheels, and I have further devised means whereby in reversing through the agency of reverse gears the motive power may be restricted to the actuation of only one pair of wheels to avoid complication and a multiplicity of parts.

Figure 1:
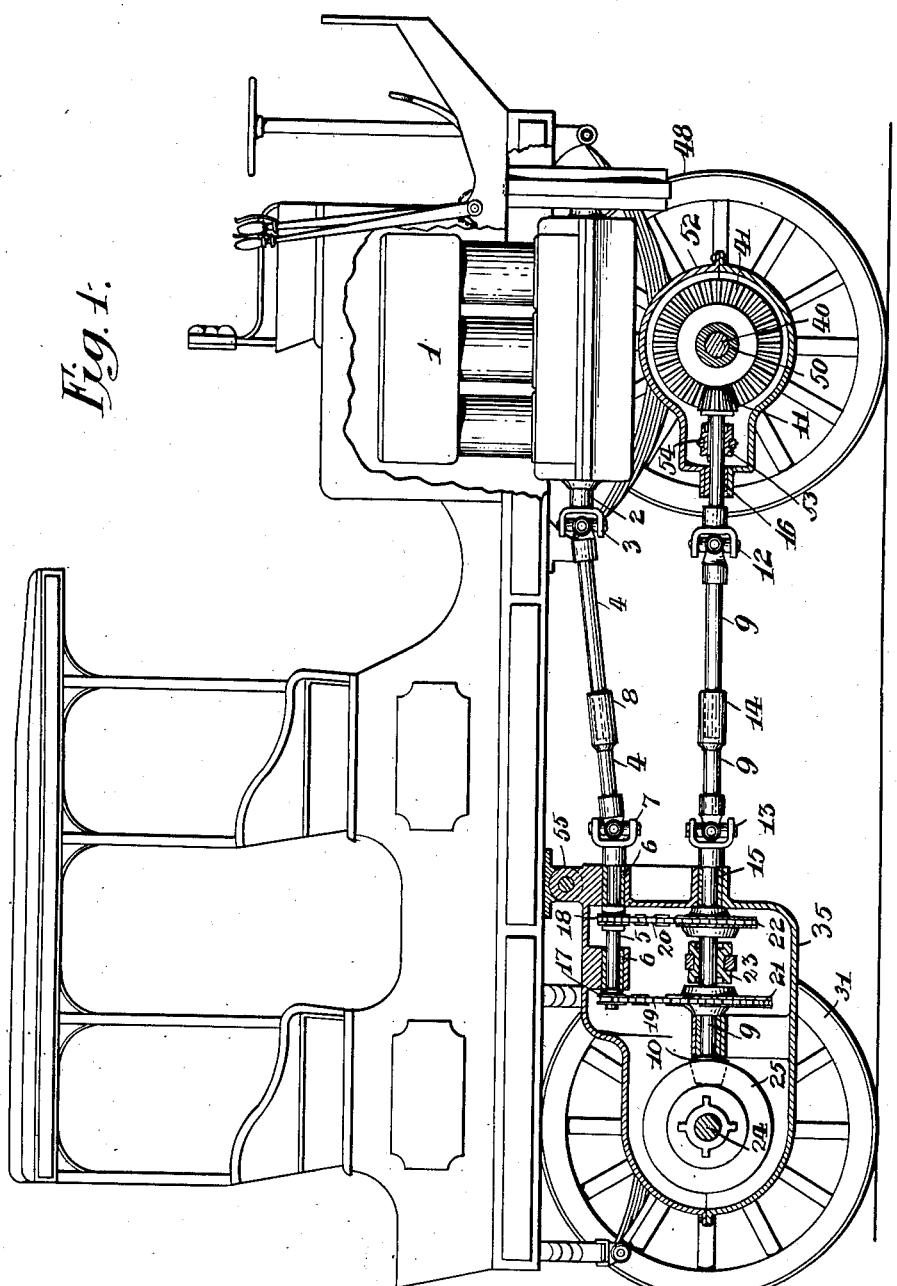
Figure 2:
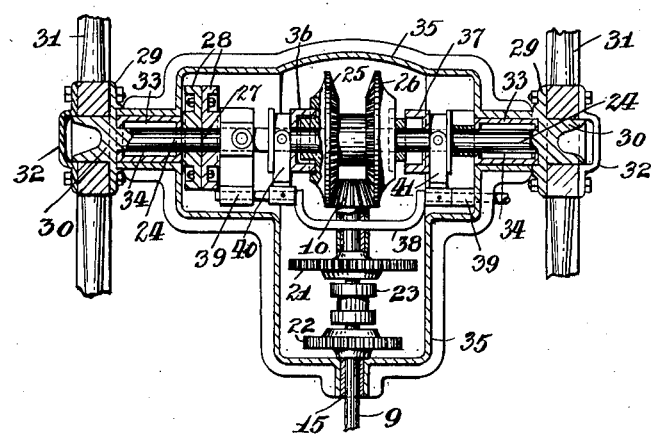
Figure 3:
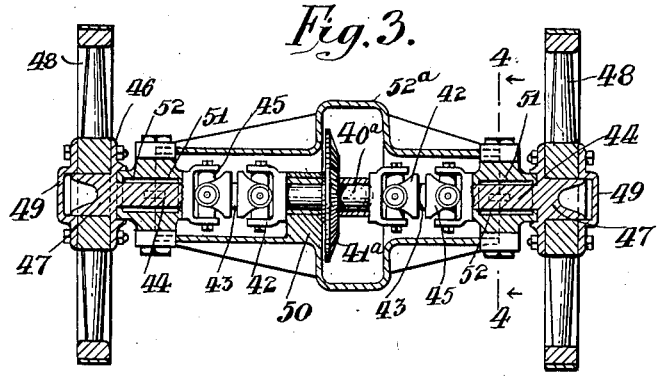
Figure 4:
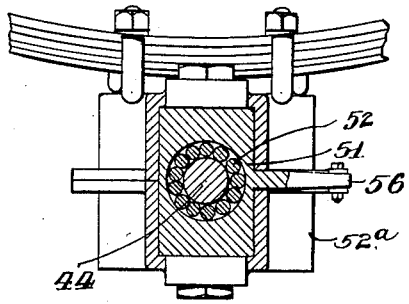

In the drawings accompanying this application, Figure 1 is a side elevation of a vehicle provided with my improved driving mechanism. Fig. 2 is a plan view of the rear axle with its actuating mechanism. Fig. 3 is a vertical section of the forward axle and its actuating mechanism, and Fig. 4 is a section through the line 4 4 of Fig. 3.

In describing my invention by aid of the drawings above referred to I desire to point out that I intend said views as merely illustrative of an example whereby my invention may be applied in practice, and I do not limit my claim to the precise arrangements and construction of parts indicated. The following description is therefore to be construed, broadly, as including substitute arrangements and constructions which are the obvious equivalents of those shown.

The drawings show a vehicle having a three-cylinder motor, as 1, having a crank-shaft 2, to which is connected by a universal joint 3 a drive-shaft 4, the latter having an extension 5, mounted in bearings 6, said drive-shaft and extension being united by a universal joint 7. The drive-shaft 4 is in two alined parts, which are splined within a sleeve 8, whereby, while said parts must turn unitedly as one member, they may independently slide longitudinally within said sleeve, thus allowing for such expansion and contraction as may occur in the drive-shaft.

A shaft 9, disposed longitudinally of the vehicle beneath shaft 4, is provided at its opposite ends with bevel-gears 10 and 11, adapted to mesh, respectively, with bevel-gears upon the rear and front axles. The gear 11 is normally loose upon the shaft. Said shaft 9 is in sections, as seen, united by universal joints, as 12 13. The intermediate section is in two alined parts whose opposed ends are splined within a sleeve 14, permitting longitudinal expansion and contraction. The rear portion of shaft 9 is journaled in bearings 15 and its forward portion in bearings 16.

Fast upon the extension 5 are the pinions 17 and 18, and chains 19 and 20 respectively mesh said pinions with gears 21 and 22, which are loosely mounted upon the shaft 9, a clutch 23, which is splined to and slidable upon said shaft, being adapted to engage either gear 21 or 22, according to the speed desired, or to leave both said gears idle when it is desired to run the engine free.

The rear axle 24, which carries loosely the oppositely-disposed bevel-gears 25 26, is for convenience in two parts, which are connected at their joint 27 by a pair of collars 28 28, that are bolted together. The axle 24 is provided near its outer ends with flanges 29 29, which may be solid with said axle. Hubs 30

30 extend from the flanges and support the wheels 31 31, which are securely fastened thereto by external plates 32 32, that are bolted to the flanges 29 29 through the wheels. Thus it will be seen that the axle and wheels are adapted to turn unitedly. The axle is supported in bearings 33 33, which may be equipped with antifriction-rollers 34 34. A case, as 35, may inclose the rear axle and its gears.

The shaft 9 is provided at its rear end with a bevel-gear 10, which is in constant mesh with the teeth of both gears 25 and 26. A clutch 36, that is slidable along the axle 24, but keyed against independent rotation thereon, is adapted to engage with the gear 25 to make it fast with the axle, and thus communicate motion from the shaft 9 to turn said axle in one direction. Similarly a clutch 37 is adapted to engage with the gear 26 to turn the axle in the other direction. Means are provided whereby the clutches 36 and 37 are moved in unison, the one into and the other out of engagement with the respective gear. These means may comprise a yoke 38, whose ends are slidably supported in bearings 39 39 and which carries two forks 40 41, adapted, respectively, to actuate the clutches 36 37.

The forward axle is composed of several sections united by universal joints to permit that flexibility necessary in steering the wheels, and the wheels are fast upon said shaft that they may turn therewith. The central axle-section, as 40$^a$, carries a bevel-gear 41$^a$, which is adapted to mesh with the bevel-gear 11 at the forward end of shaft 9. Said central section unites at its opposite ends by universal joints 42 42, respectively, with short shaft-sections 43 43, and they in turn respectively connect at their outer ends with the terminal shaft-sections 44 44 through universal joints 45 45. The sections 44 44 are each formed integrally with a flange 46, from which extends a hub 47, carrying a wheel 48, an outer plate 49 being bolted to said flange 46 through the wheel to unite all said members. The central axle-section 40$^a$ is mounted in a bearing 50 and the terminal sections in bearings 51 51, which may have antifriction-rollers 52. Said bearings 51 51 take the place of the usual steering-knuckles in this class of vehicle. A case, as 52$^a$, may inclose the forward axle and its gears.

The shaft 9 is provided intermediate its joint 13 and the forward bevel-gear 11 with a clutch 53, that is slidable upon the shaft, but keyed against independent rotation thereon. It is intended that the clutch be in engagement with gear 11 (whereby the shaft 9 will drive the forward axle) when the gear 10 is actuating the gear 25, which drives the rear axle forwardly; but in reversing when the gear 25 is freed and the gear 26 is clutched and caused to rotate the shaft 9 in the opposite direction the means employed to move the yoke 38 may also act upon the clutch 53 to disengage the gear 11 from gear 41, thus removing driving power from the forward axle during the reverse travel of the vehicle.

A clutch-fork 54 is shown applied to the clutch 53; but no illustration is given of connection-rods and parts between said fork and the yoke 38 or to the actuating-lever, because such parts are well known in this art, and their particular arrangement involves merely the convenience of the builder, according to the design of vehicle produced.

The case 35, carrying the bearings 33 33 and inclosing the rear axle and allied parts, is supported from the vehicle body or frame by a pivotal connection 55, whereby the shaft extension 5 and shaft 9 are maintained in parallelism, notwithstanding any variations that may occur in vertical movement between the forward and rear portions of the apparatus.

It will be noted that the gears or sprockets 21 22, comprising the change-speed mechanism, are disposed transversely of the vehicle instead of longitudinally. This is a novel arrangement rendered necessary in carrying out my improvements.

The bearings or knuckles 51 51 are provided with steering adjuncts or connections, as 56.

The operation of my invention will be perfectly obvious to all familiar with motor-vehicles, wherefore further explanation thereof is deemed unnecessary.

Having now described my invention, I declare that what I claim is—

In a motor-vehicle, a motor disposed forwardly thereof, a crank-shaft extending rearwardly therefrom and carrying change-speed pinions, a longitudinal driven shaft having a rigid bevel-gear at its rear end and a loose bevel-gear at its forward end, and carrying transverse change-speed sprockets adapted to be connected with said pinions; a rear axle carrying loosely two opposed bevel-gears meshed at opposite sides with the rear bevel-gear, and means for clutching either one of said opposed gears to the axle; together with a jointed forward axle having means for flexing in steering, and carrying a bevel-gear in mesh with said loose bevel-gear on the driven shaft, and means for clutching said bevel-gear to its shaft with the forward drive of the rear axle.

Signed at New York this 15th day of June, 1905.

EPHRAIEM CHAQUETTE.

Witnesses:
FREDERICK C. BONNY,
F. W. BARKER.